US012764699B2

(12) United States Patent
Yerramalli et al.

(10) Patent No.: US 12,764,699 B2
(45) **Date of Patent: *Oct. 13, 2026**

(54) ENABLE USER EQUIPMENT POSITIONING THROUGH PAGING

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 18/000,583

(22) PCT Filed: Jun. 25, 2021

(86) PCT No.: PCT/US2021/039036
§ 371 (c)(1),
(2) Date: Dec. 2, 2022

(87) PCT Pub. No.: WO2022/020059
PCT Pub. Date: Jan. 27, 2022

(65) Prior Publication Data
US 2023/0224850 A1 Jul. 13, 2023

(30) Foreign Application Priority Data
Jul. 23, 2020 (GR) .............................. 20200100435

(51) Int. Cl.
*H04W 64/00* (2009.01)
*G01S 5/00* (2006.01)
(Continued)

(52) U.S. Cl.
CPC ........... *H04W 64/00* (2013.01); *G01S 5/0027* (2013.01); *G01S 13/765* (2013.01);
(Continued)

(58) Field of Classification Search
CPC .. H04W 68/005; H04W 64/00; H04L 5/0048; G01S 13/765; G01S 5/0027
See application file for complete search history.

(56) References Cited

U.S. PATENT DOCUMENTS

2019/0182794 A1 6/2019 Wong et al.
2019/0200320 A1 6/2019 Selvaganapathy et al.
(Continued)

FOREIGN PATENT DOCUMENTS

CN 101247629 A 8/2008
EP 3497991 A1 6/2019
(Continued)

OTHER PUBLICATIONS

International Search Report and Written Opinion—PCT/US2021/039036—ISA/EPO—Oct. 8, 2021.
Taiwan Search Report—TW110123639—TIPO—Feb. 27, 2025.

*Primary Examiner* — Dai Phuong
(74) *Attorney, Agent, or Firm* — Procopio, Cory, Hargreaves & Savitch LLP

(57) ABSTRACT

Techniques are provided for positioning of user equipment (UE) with paging messages. An example method for positioning a user equipment with paging messages includes receiving a positioning paging message with a user equipment in an idle state, measuring positioning measurements in response to receiving the positioning paging message, determining location information based at least in part on the positioning measurements, and transmitting the location information via a random access procedure.

32 Claims, 14 Drawing Sheets

(51) Int. Cl.

| | |
|---|---|
| ***G01S 13/76*** | (2006.01) |
| ***H04L 5/00*** | (2006.01) |
| ***H04W 68/00*** | (2009.01) |
| ***H04W 74/0833*** | (2024.01) |
| *H04W 74/0836* | (2024.01) |

(52) U.S. Cl.
CPC ......... *H04L 5/0048* (2013.01); *H04W 68/005* (2013.01); *H04W 74/0833* (2013.01); *H04W 74/0836* (2024.01)

(56) References Cited

U.S. PATENT DOCUMENTS

| | | | | |
|---|---|---|---|---|
| 2020/0229130 | A1* | 7/2020 | Keating | H04W 52/0229 |
| 2020/0314795 | A1* | 10/2020 | Wakabayashi | H04W 64/00 |
| 2021/0022108 | A1* | 1/2021 | Li | H04W 24/08 |
| 2021/0235412 | A1 | 7/2021 | Chen et al. | |
| 2022/0342028 | A1* | 10/2022 | Sun | H04W 76/20 |
| 2023/0247582 | A1* | 8/2023 | Li | H04W 64/00<br>455/435.1 |
| 2024/0015762 | A1 | 1/2024 | Yerramalli et al. | |
| 2024/0407046 | A1* | 12/2024 | Lee | H04W 76/27 |

FOREIGN PATENT DOCUMENTS

| | | | | |
|---|---|---|---|---|
| EP | 3501215 | A1 | 6/2019 | |
| WO | 2017206959 | A1 | 12/2017 | |
| WO | WO 2018/028925 | * | 2/2018 | H04W 64/00 |
| WO | 2020146739 | A1 | 7/2020 | |

* cited by examiner

ENABLE USER EQUIPMENT POSITIONING THROUGH PAGING

CROSS-REFERENCE TO RELATED APPLICATIONS

This application is the National Stage of International Application No. PCT/US2021/039036, filed Jun. 25, 2021, entitled "ENABLE USER EQUIPMENT POSITIONING THROUGH PAGING," which claims the benefit of Greek Patent Application No. 20200100435, filed Jul. 23, 2020, entitled "ENABLE USER EQUIPMENT POSITIONING THROUGH PAGING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

SUMMARY

An example method for positioning a user equipment with paging messages according to the disclosure includes receiving a positioning paging message with a user equipment in an idle state, measuring positioning measurements in response to receiving the positioning paging message, determining location information based at least in part on the positioning measurements, and transmitting the location information via a random access procedure.

Implementations of such a method may include one or more of the following features. The method may include receiving assistance data, and measuring the positioning measurements may be based at least in part on the assistance data. At least a portion of the assistance data may be included in the positioning paging message. At least a portion of the assistance data may be included in a positioning system information block. Measuring the positioning measurements may include receiving two or more positioning reference signals and determining the location information may include determining a time of arrival, time difference of arrival based on the two or more positioning reference signal. Measuring the positioning measurements may include receiving enhanced cell identification (E-CID) information from one or more proximate stations. Measuring the positioning measurements may include determining an angle of arrival of one or more beams transmitted by one or more proximate stations. The random access procedure may be a two-step random access procedure. The user equipment may be configured to execute a discontinuous reception mode and the positioning paging message may be received during a paging occasion. Transmitting location information may include transmitting a random access preamble. At least one information element within the positioning paging message may be based at least in part on a positioning capability of the user equipment. The positioning paging message may include one or more information elements configured to cause the user equipment to measure positioning measurements and transmit corresponding location information on a periodic basis. The method may include performing a connected mode setup procedure in response to receiving the positioning paging message, such that measuring the positioning measurements includes obtaining positioning measurements in a connected mode. Obtaining the positioning measurements may include obtaining round trip time measurements with one or more stations. Measuring the positioning measurements may include transmitting a modified sounding reference signal for positioning based at least in part on the positioning paging message.

An example method for determining a location of a user equipment according to the disclosure includes transmitting a positioning paging message to the user equipment, wherein the user equipment is an idle state, and receiving location information from the user equipment via a random access procedure.

Implementations of such a method may include one or more of the following features. One or more positioning system information blocks comprising positioning assistance data may be transmitted. The location information may be provided to a network server. Transmitting the positioning paging message may include transmitting the positioning paging message on a plurality of beams. Positioning assistance data may be received from a server, such that at least one information element in the positioning paging message may be based on the positioning assistance data. The positioning assistance data may include one or more positioning reference signal resource elements. The positioning paging message may include a random access preamble and receiving the location information includes receiving the random access preamble. The random access procedure may be a two-step random access procedure. The user equipment may be in a discontinuous reception mode, and transmitting the positioning paging message may be based at least in part on a paging occasion associated with the discontinuous reception mode. At least one information element in the positioning paging message may be based on a positioning capability of the user equipment. At least one information element in the positioning paging message may be configured to cause the user equipment to provide periodic location information. A positioning reference signal may be transmitted subsequent to transmitting the positioning paging message. A connected state setup procedure may be performed with the user equipment subsequent to transmitting the positioning paging message.

An example apparatus according to the disclosure includes a memory, at least one transceiver, at least one processor communicatively coupled to the memory and the at least one transceiver and configured to receive a positioning paging message while in an idle state, measure positioning measurements in response to receiving the positioning paging message, determine location information based at least in part on the positioning measurements, and transmit the location information via a random access procedure.

Implementations of such an apparatus may include one or more of the following features. The at least one processor may be further configured to receive assistance data and perform the positioning measurements is based at least in part on the assistance data. At least a portion of the assistance data may be included in the positioning paging message. The at least one processor may be further configured to receive a positioning system information block, such that at least a portion of the assistance data is included in the positioning system information block. The at least one processor may be further configured to receive two or more positioning reference signals and determine a time of arrival, time difference of arrival based on the two or more positioning reference signal. The at least one processor may be further configured to receive enhanced cell identification (E-CID) information from one or more proximate stations. The at least one processor may be further configured to determine an angle of arrival of one or more beams transmitted by one or more proximate stations. The random access procedure may be a two-step random access procedure. The at least one processor may be further configured to execute a discontinuous reception mode and receive the positioning paging message during a paging occasion. The at least one processor may be further configured to receive a random access preamble, and transmit location information with the random access preamble. At least one information element within the positioning paging message may be based at least in part on a positioning capability of the apparatus. The positioning paging message may include one or more information elements configured to cause the apparatus to measure positioning measurements and transmit corresponding location information on a periodic basis. The at least one processor may be further configured to perform a connected mode setup procedure in response to receiving the positioning paging message, and obtain positioning measurements in a connected mode. The at least one processor may be further configured to obtain round trip time measurements with one or more stations. The at least one processor may be further configured to transmit a modified sounding reference signal for positioning based at least in part on the positioning paging message.

An example apparatus according to the disclosure includes a memory, at least one transceiver, at least one processor communicatively coupled to the memory and the at least one transceiver and configured to transmit a positioning paging message to a user equipment, wherein the user equipment is an idle state, and receive location information from the user equipment via a random access procedure.

Implementations of such an apparatus may include one or more of the following features. The at least one processor may be further configured to transmit one or more positioning system information blocks comprising positioning assistance data. The at least one processor may be further configured to provide the location information to a network server. The at least one processor may be further configured to transmit the positioning paging message on a plurality of beams. The at least one processor may be further configured to receive positioning assistance data from a server, wherein at least one information element in the positioning paging message is based on the positioning assistance data. The positioning paging message may include a random access preamble and the at least one processor is configured to receive the random access preamble. The random access procedure may be a two-step random access procedure. The user equipment may be in a discontinuous reception mode, and the at least one processor may be configured to transmit the positioning paging message based at least in part on a paging occasion associated with the discontinuous reception mode. At least one information element in the positioning paging message may be based on a positioning capability of the user equipment. At least one information element in the positioning paging message may be configured to cause the user equipment to provide periodic location information. The at least one processor may be further configured to transmit a positioning reference signal subsequent to transmitting the positioning paging message. The at least one processor may be further configured to perform a connected state setup procedure with the user equipment subsequent to transmitting the positioning paging message.

An example apparatus according to the disclosure includes means for receiving a positioning paging message while in an idle state, means for measuring positioning measurements in response to receiving the positioning paging message, means for determining location information based at least in part on the positioning measurements, and means for transmitting the location information via a random access procedure.

An example apparatus according to the disclosure includes means for transmitting a positioning paging message to a user equipment, wherein the user equipment is an idle state, and means for receiving location information from the user equipment via a random access procedure.

An example non-transitory processor-readable storage medium comprising processor-readable instructions configured to cause one or more processors to position a user equipment with paging messages according to the disclosure includes code for receiving a positioning paging message with the user equipment in an idle state, code for measuring positioning measurements in response to receiving the positioning paging message, code for determining location information based at least in part on the positioning measurements, and code for transmitting the location information via a random access procedure.

An example non-transitory processor-readable storage medium comprising processor-readable instructions configured to cause one or more processors to determine a location of a user equipment according to the disclosure includes code for transmitting a positioning paging message to the user equipment, wherein the user equipment is an idle state, and code for receiving location information from the user equipment via a random access procedure.

Items and/or techniques described herein may provide one or more of the following capabilities, as well as other capabilities not mentioned. A user equipment in an idle or inactive mode may receive a positioning paging message from a serving station. Assistance data may also be transmitted to the user equipment. In response to receiving the positioning paging message, the user equipment may obtain positioning measurements. The positioning measurements may be based on passive positioning methods, such as an observed time difference of arrival of positioning reference signals. Active positioning methods, such as round trip time measurements, may also be used. The user equipment may provide the measurement information or corresponding estimated position information to the serving station. The user equipment may remain in an unconnected state and provide the location information via a random access procedure. The user equipment may transition to a connected state and provide the location information via uplink channels. The received location information may be provided to other network resources, such as location servers and external clients. Other capabilities may be provided and not every implementation according to the disclosure must provide any, let alone all, of the capabilities discussed.

DETAILED DESCRIPTION

Techniques are discussed herein for positioning of user equipment (UE) with paging messages. For example, a UE may be in an idle or inactive mode and configured to receive paging messages from a network. The UE may be configured to obtain positioning measurements upon receipt of one or more paging messages. In 5G NR, for example, the positioning measurements may be based on different positioning methods such as downlink (DL) and uplink (UL) Time Difference of Arrival (TDOA), DL Angle of Departure (AoD), UL Angle of Arrival (AoA), DL initiated Round Trip Time (RTT), enhanced cell identification (E-CID) and combinations of these methods. The network may be configured to provide assistance data via one or more paging messages. For passive positioning methods, the UE may remain in an idle state (i.e., not connected, in an idle mode, in an inactive mode, etc.) and report the positioning measurements, or other location information, to the network via a random access procedure. Other UL positioning methods may require the UE to transition to a connected state to obtain measurements and report results. These techniques and configurations are examples, and other techniques and configurations may be used.

Figure 1:
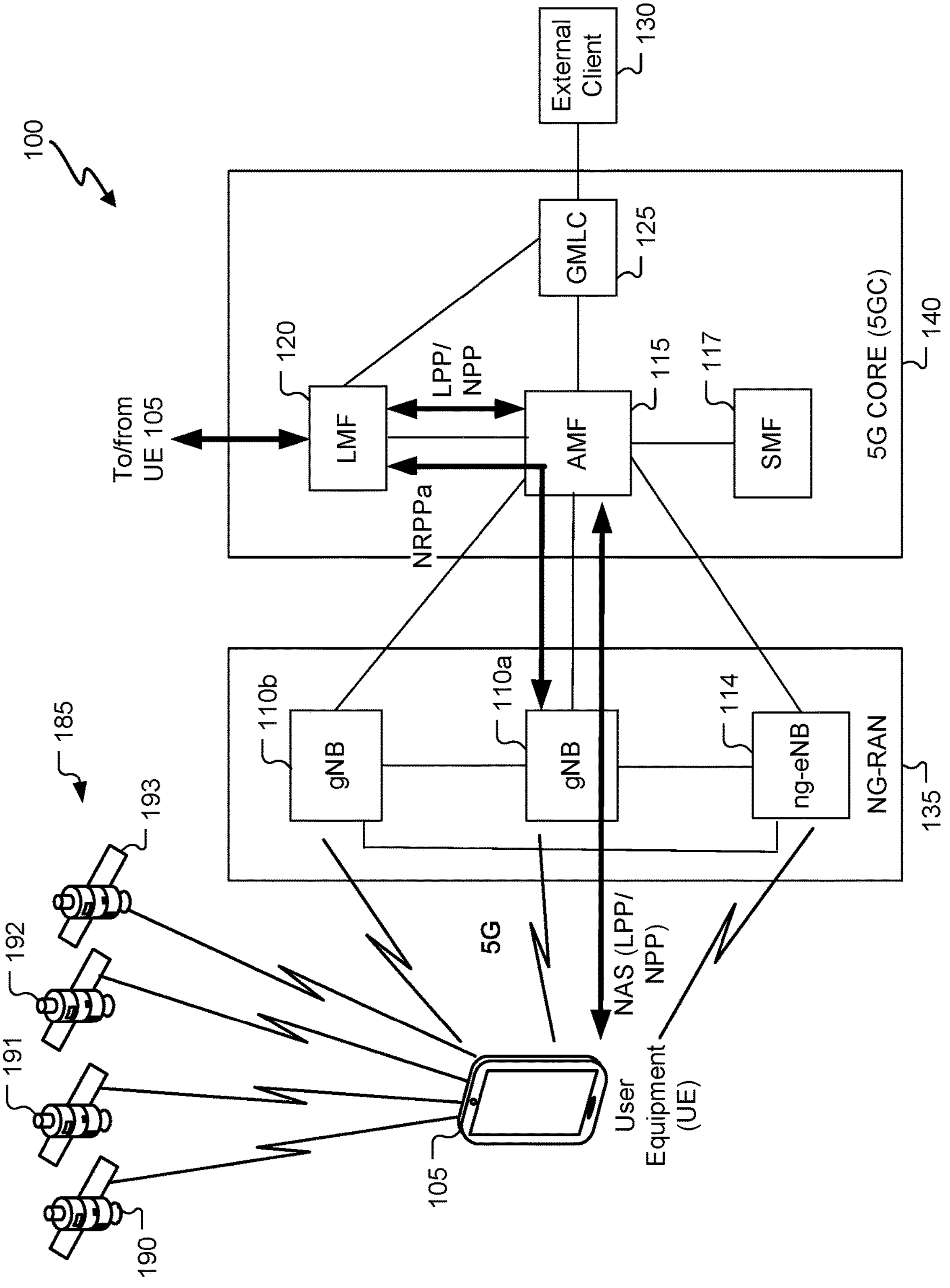
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

BSs, such as the gNB 110*a*, gNB 110*b*, ng-eNB 114, may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. In an example, the LMF 120 may be collocated with the NG-RAN 135 and be configured to communicate with the UE 105 via Radio Resource Control (RRC) signaling.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional PRS or SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
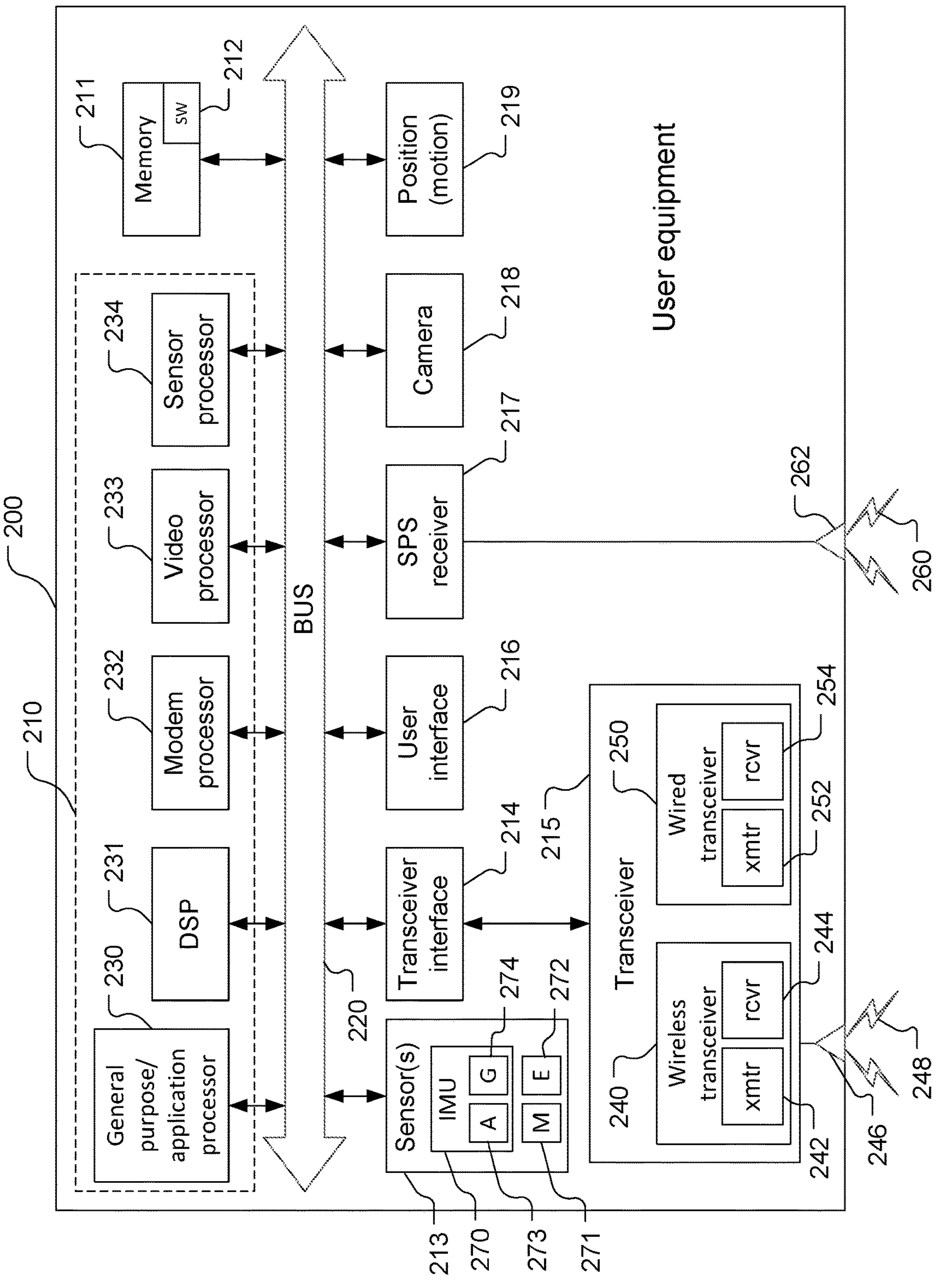
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sending (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
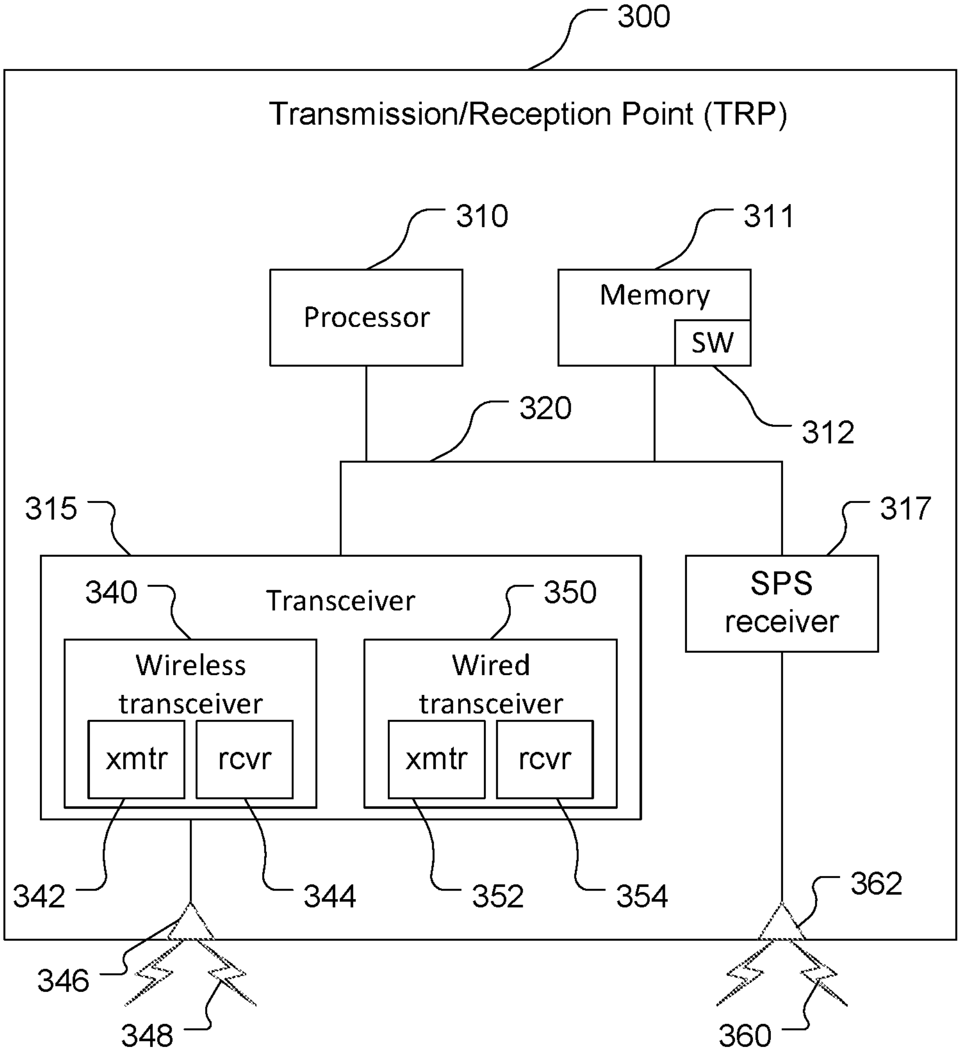
FIG. 3 is a block diagram of components of an example transmission/reception point shown in FIG. 1.

Referring also to FIG. 3, an example of a TRP 300 of BSs, such as the gNB 110*a*, gNB 110*b*, ng-eNB 114, comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs, such as the gNB 110*a*, gNB 110*b*, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
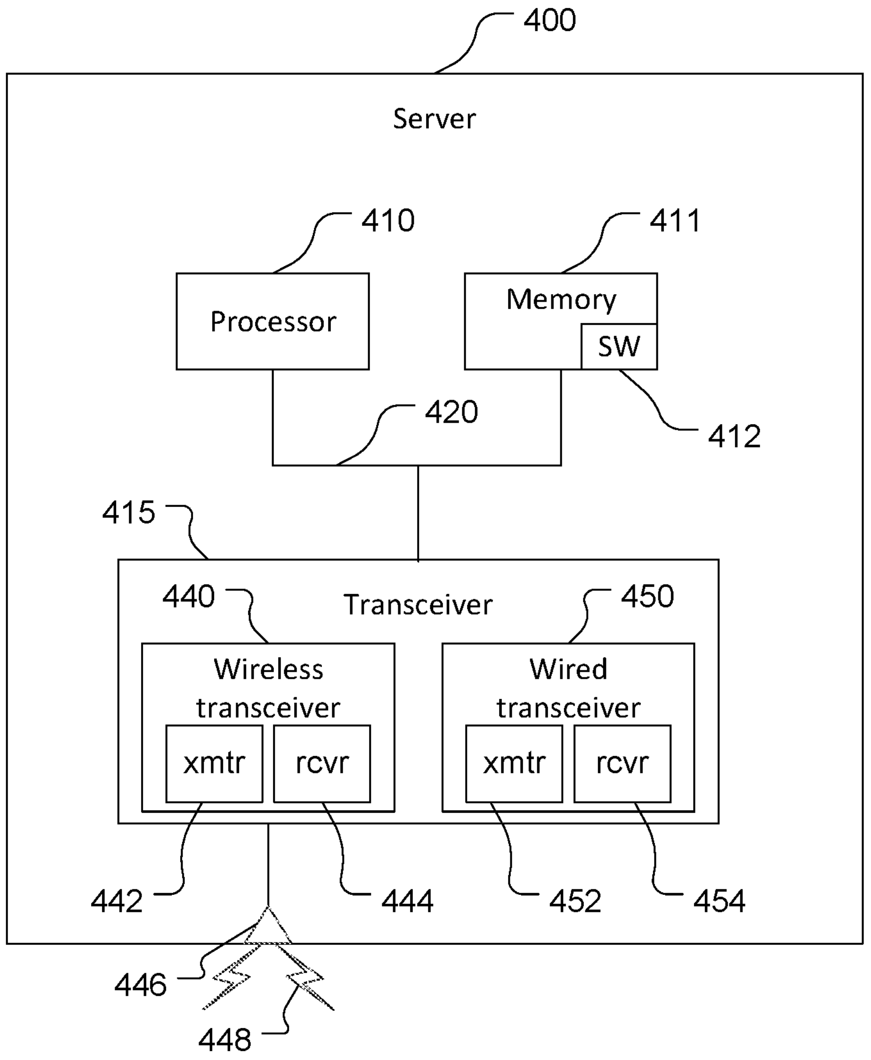
FIG. 4 is a block diagram of components of an example server shown in FIG. 1.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication).

One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
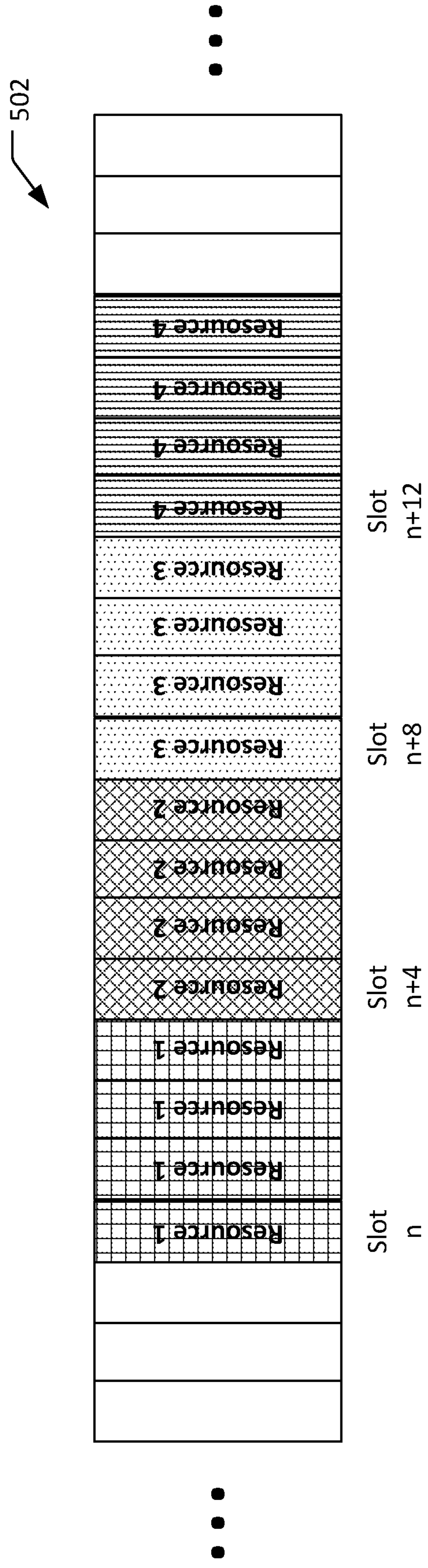
FIGS. 5A and 5B illustrate example downlink positioning reference signal resource sets.
Figure 5B:
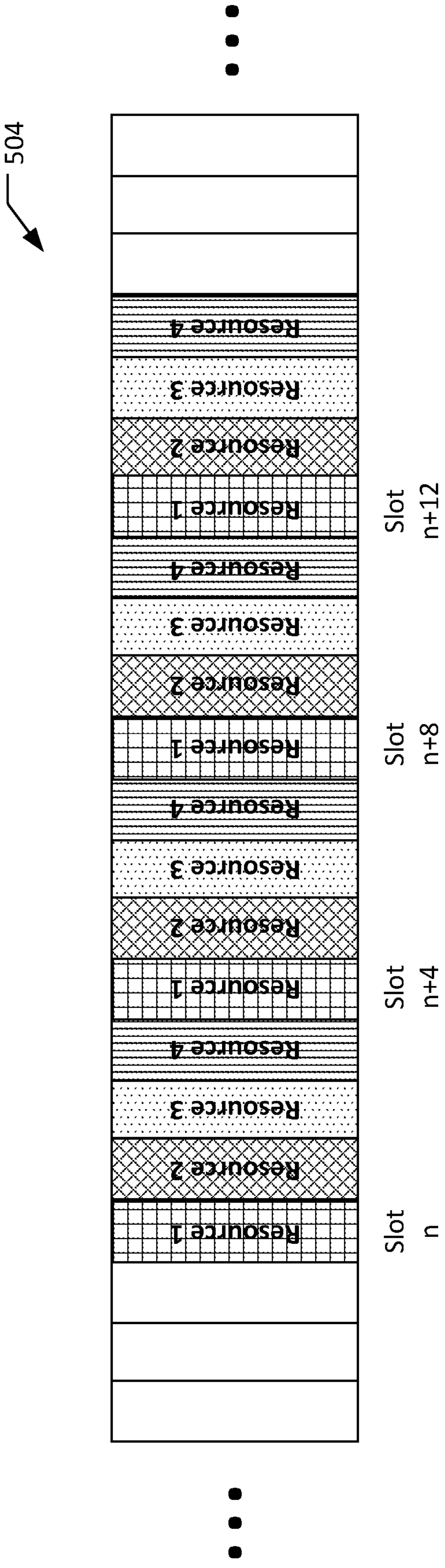

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
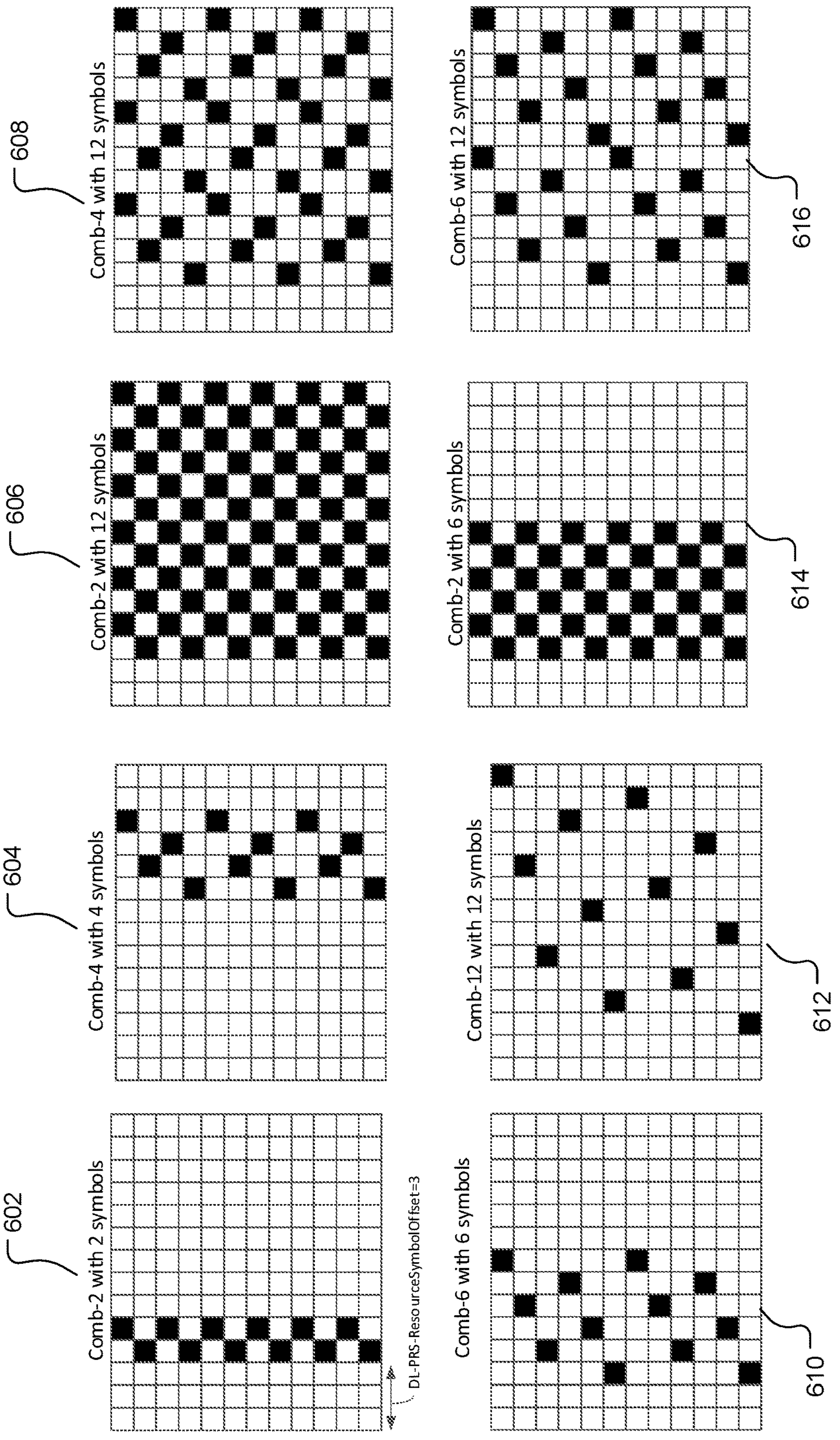
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
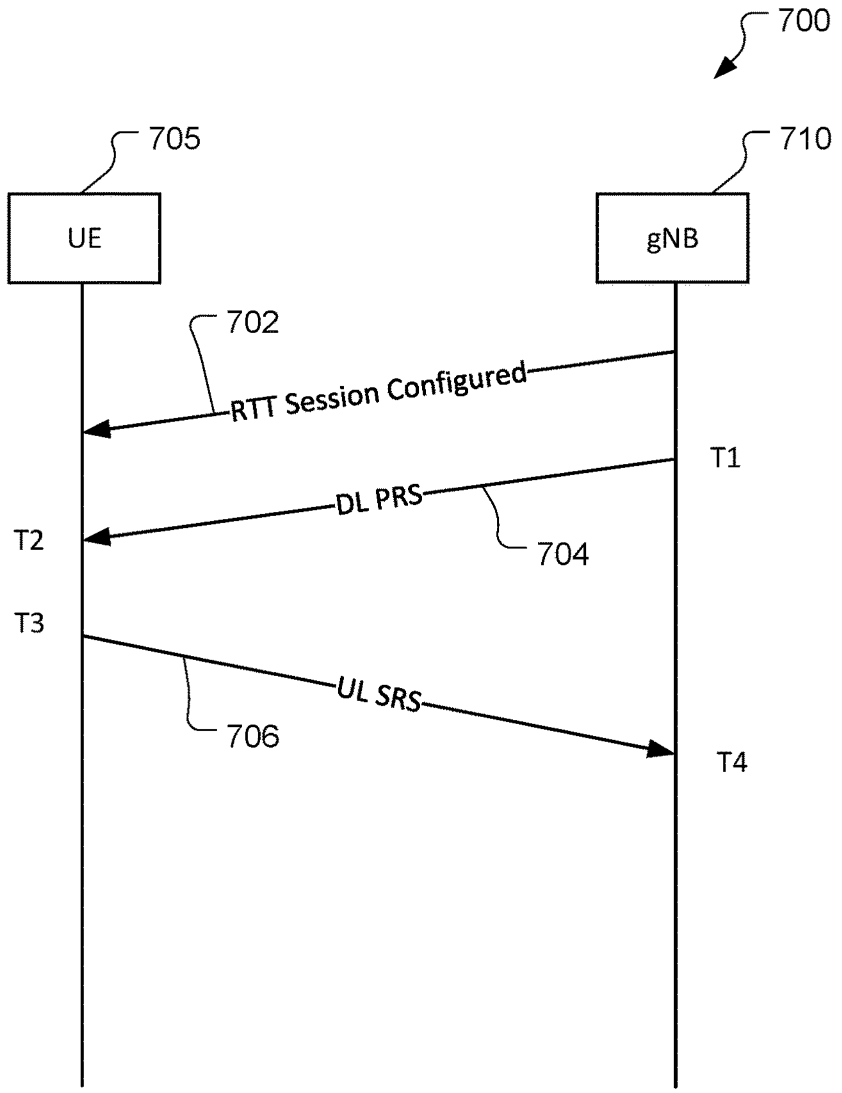
FIG. 7 is an example round trip time message flow between a user equipment and a base station.

Referring to FIG. 7, an example round trip message flow 700 between a user equipment 705 and a base station 710 is shown. The UE 705 is an example of the UE 105, 200 and the base station 710 may be a gNB 110*a-b* or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 700 may be initiated by the base station 710 with a RTT session configured message 702. The base station may utilize the LPP/NRPPa messaging to configure the RTT session. At time T1, the base station 710 may transmit a DL PRS 704, which is received by the UE 705 at time T2. In response, the UE 705 may transmit a Sounding Reference Signal (SRS) for positioning message 706 at time T3 which is received by the base station 710 at time T4. The distance between the UE 705 and the base station 710 may be computed as:

$$\text{distance} = \frac{c}{2}((T4 - T1) - (T3 - T2)) \tag{1}$$

where c=speed of light.

The UE 705 may be configured to perform the RTT message flow 700 based on a paging message received from a network, such as from the base station 710. In an example, a paging message may be sent in place of, or in addition to, the RTT session configured message 702.

In dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 8:
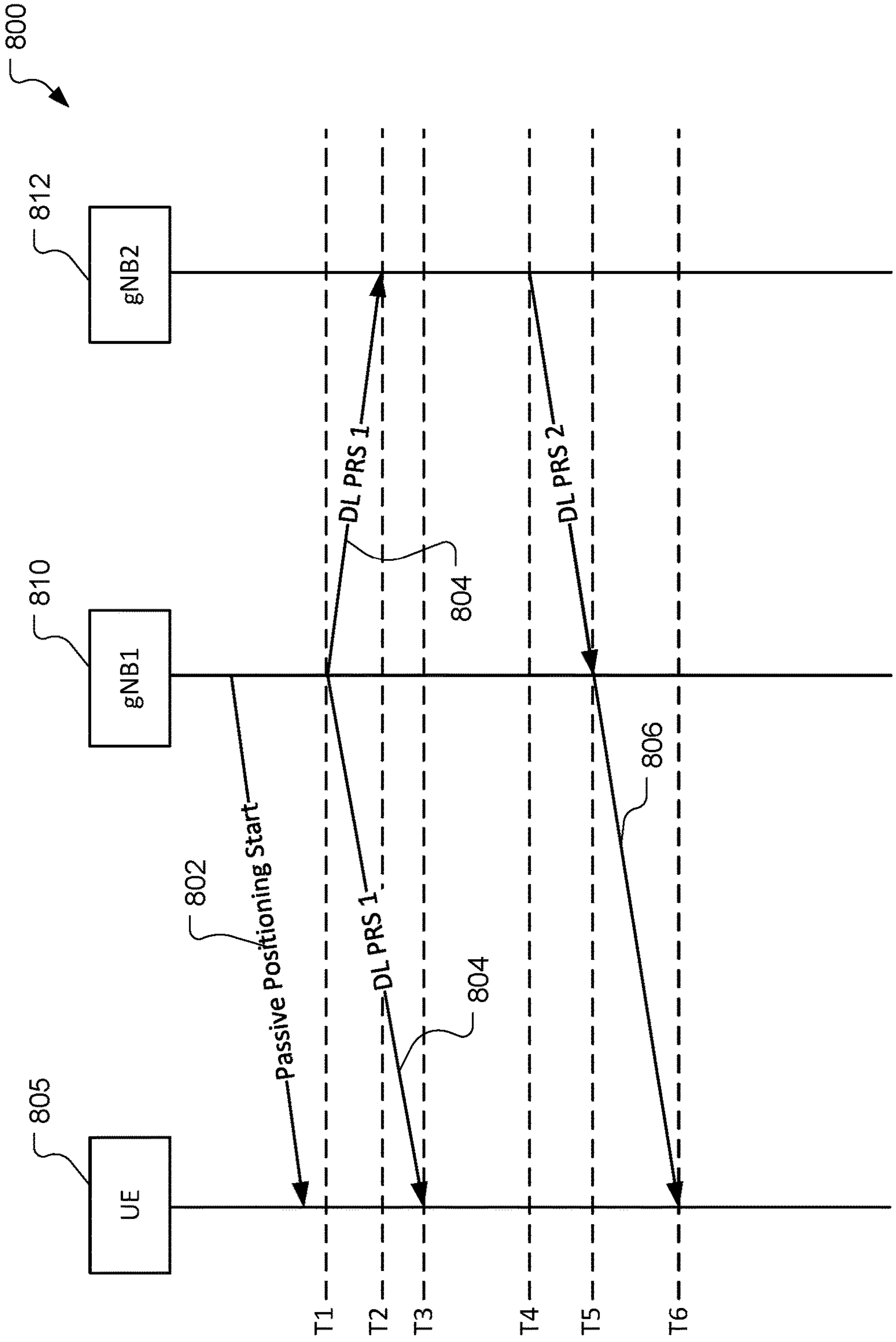
FIG. 8 is an example message flow for passive positioning of a user equipment.

Referring to FIG. 8, an example message flow 800 for passive positioning of a user equipment 805 is shown. The message flow includes the UE 805, a first base station 810 and a second base station 812. The UE 805 is an example of the UEs 105, 200, and the base stations 810, 812 are examples of the gNBs 110*a-b* or ng-eNB 114. In general, TDOA positioning techniques utilize the difference in travel times between one entity and other entities to determine relative ranges from the other entities and those, combined with known locations of the other entities may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 810 may provide a passive positioning start message 802 to the UE 805. The passive positioning start message 802 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 804 which may be received by the second base station 812 at time T2 (for example), and by the UE 805 at time T3. The second base station 812 may be configured to transmit a second DL PRS 806 at time T4, which is received by the first base station 810 at time T5 and by the UE 805 at time T6. The time between T2 and T4 may be a configured turnaround time on the second base station 812 and thus a known period of time. The time between T1 and T2 (i.e., time of flight) may also be known because the first and second base stations 810, 812 are in fixed locations. The turnaround time (i.e., T4–T2) and the time of flight (i.e., T2–T1) may be broadcast or otherwise provided to the UE 805 for use in positioning calculations. The UE 805 may observe the difference between T6 and T3, and the distances may be computed as:

$$D_{gNB1-UE} = \frac{c}{2}((T_3 - T_1)) \tag{2}$$

$$D_{gNB2-UE} = \frac{c}{2}((T_6 - T_1) - (T_4 - T_2) - (T_2 - T_1)) = \frac{c}{2}(T_6 - T_4) \tag{3}$$

$$D_{gNB2-UE} - D_{gNB1-UE} = \frac{c}{2}((T_6 - T_3) - (T_4 - T_2) - (T_2 - T_1)) \tag{4}$$

A paging message may be transmitted by a network resource, such as the first or second base stations 810, 812, or other serving station, to instruct the UE 805 to perform the message flow 800. In an example, the paging message may be in place of, or in addition to, the passive positioning start message 802.

In an embodiment, one or more UEs may be in a fixed location and configured to perform some or all of the functions of the base stations described herein. For example, a UE may be configured to determine a location (e.g., using inertial, satellite and/or terrestrial techniques) and transmit positioning reference signals to neighboring base stations and/or UEs. The UEs in a network may be configured to transmit omnidirectional sounding reference signals (SRS) for positioning and/or beamformed SRS for positioning based on the capabilities of the network and/or the UE. For example, UEs configured for 5G sub 7 GHz operations may utilize omnidirectional signaling, and UEs configured for higher frequencies may utilize analog beam forming. The UE may transmit SRS for positioning with existing uplink and sidelink communication interfaces such as Uu and PCS, for example.

Figure 9:
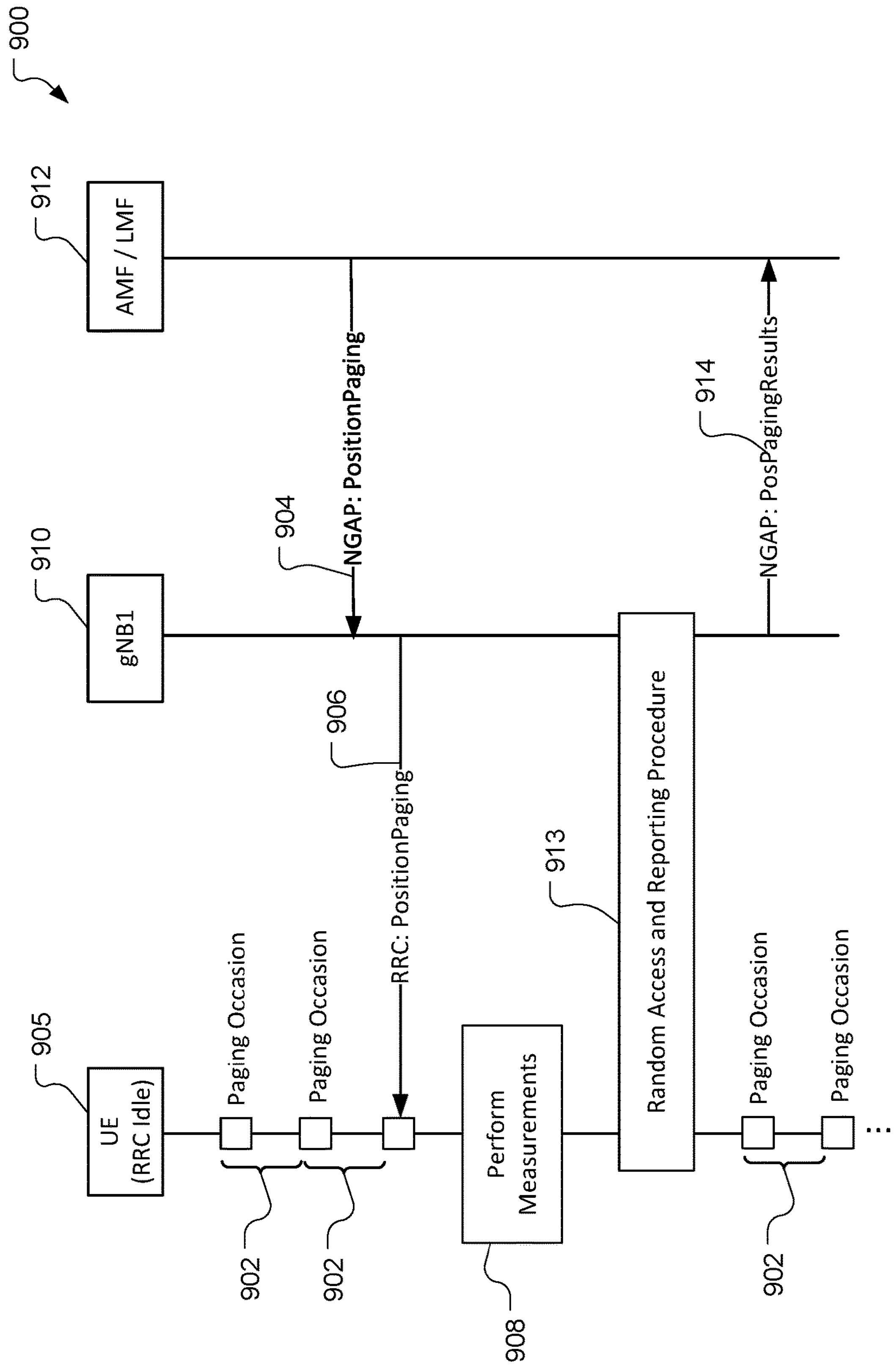
FIG. 9 is an example message flow to enable user equipment positioning through paging.

Referring to FIG. 9, an example message flow 900 to enable user equipment positioning through paging is shown. The message flow 900 includes a UE 905, a station 910, and server 912. The UE 905 is an example of the UEs 105, 200, and the station 910 is an example of a gNB 110*a-b* or ng-eNB 114. The server 912 is an example of the server 400 and may be an LMF 120 and/or the AMF 115. The server 912 may be communicatively coupled to an external client 130 and configured to initiate position paging described herein based on, for example, requests from external clients 130, or other networked applications (e.g., location based services, emergency location systems, etc.). In general, in 5G systems, the UE 905 may camp on the 5G system in an RRC idle state (e.g., idle mode or RRC inactive mode). The UE 905 may be configured to listen for paging messages while in the RRC idle or RRC inactive states. The AMF 115 may be configured to maintain a record of the UE location based on a tracking area and thus may send paging messages to the stations and/or beams associated with the tracking area. In an example, the UE 905 may utilize a discontinuous reception (DRX) mode to preserve battery life. During a DRX cycle 902, the UE 905 may enter a sleep mode between periodic paging occasions. At each paging occasion, the UE 905 may scan for downlink channels (e.g., the Physical Downlink Control Channel (PDCCH)). The UE 905 may receive System Information Blocks (SIBs) to determine when to schedule the positioning occasions.

The server 912 may be configured to send a NGAP positioning paging message 904 to obtain location information for the UE 905. The NGAP positioning paging message 904 may be based on a request from the LMF 120, from an external client 130, or other system requirement. The NGAP positioning paging message 904 may include one or more information elements including identification information associated with the UE 905, DRX information, positioning assistance data, UE capability data, and other information the station 910 may need to transmit a positioning paging message 906 to the UE 905. In an example, the positioning paging message 906 may utilize RRC signaling and may be timed to coincide with the paging occasions of the UE 905. The positioning paging message 906 may be broadcast by one or more stations associated with the tracking area associated with the UE 905. The positioning paging message 906 may be sent by one or more beams in networks which utilize beam forming technologies (e.g., millimeter Wave (mmW)). In an example, the positioning paging message 906 may include information elements containing positioning assistance data to enable the UE 905 to obtain positioning measurements. Information elements in the positioning paging message 906 may include reference information to enable the UE 905 to obtain positioning assistance data from the network (e.g., via other broadcasts or messaging).

At stage 908, the UE 905 is configured to perform positioning measurements. In an example, the UE 905 may remain in an idle or inactive state (i.e., not connected) to obtain passive measurements, such as described in FIG. 8. The UE 905 may receive, or have stored locally, assistance data configured to enable the reception of DL PRS such as the first DL PRS 804 and the second DL PRS 806 from stations on the network. In an example, the station 910 may be configured to transmit one or more DL PRSs. The DL PRSs may be associated with beam identification information to enable the UE 905 to determine which DL PRS to listen for. In an example, the DL PRS may be on different frequency layers, and may be based on different radio access technologies. For example, DL PRSs may be associated with LTE, 5G, sub 6 GHz, mmW, or other frequencies and technologies. In an embodiment, the UE 905 may be configured to utilize other passive positioning methods such as E-CID, RSSI, AoA, etc. at stage 908 to obtain location information.

The UE 905 may perform a random access and reporting procedure 913 to report the location information obtained at stage 908. The location information may be RSTD timing information associated with the received DL PRS. The location information may be a position estimate computed by the UE 905. The random access and reporting procedure 913 may be a contention based or contention free procedure. For example, the positioning paging message 906, or other transmitted information, may include a dedicated random access preamble to enable the UE 905 to provide data via a random access channel (RACH).

Figure 10A:
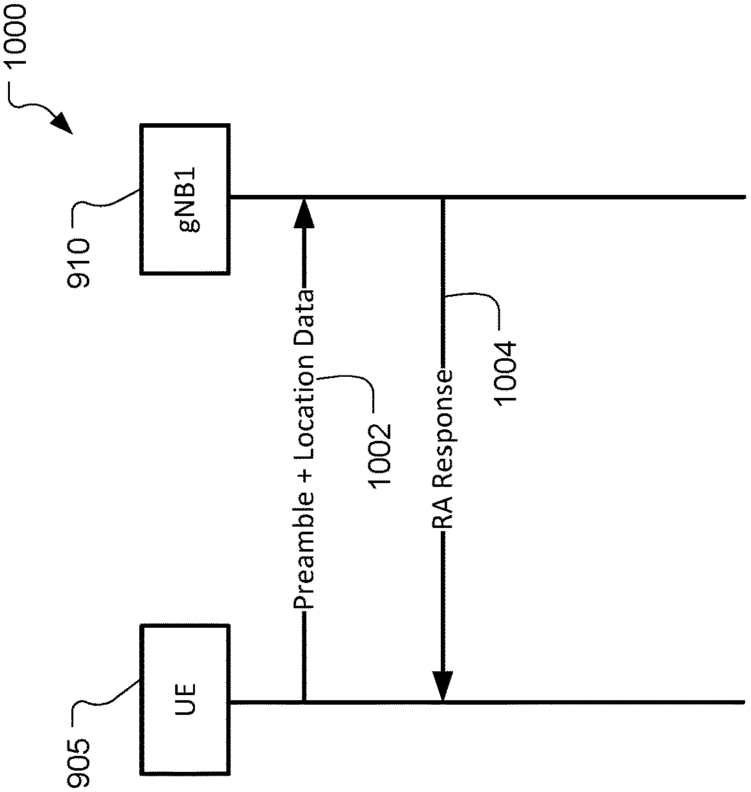
FIGS. 10A and 10B are example message flows for providing location data via a random access procedure.
Figure 10B:
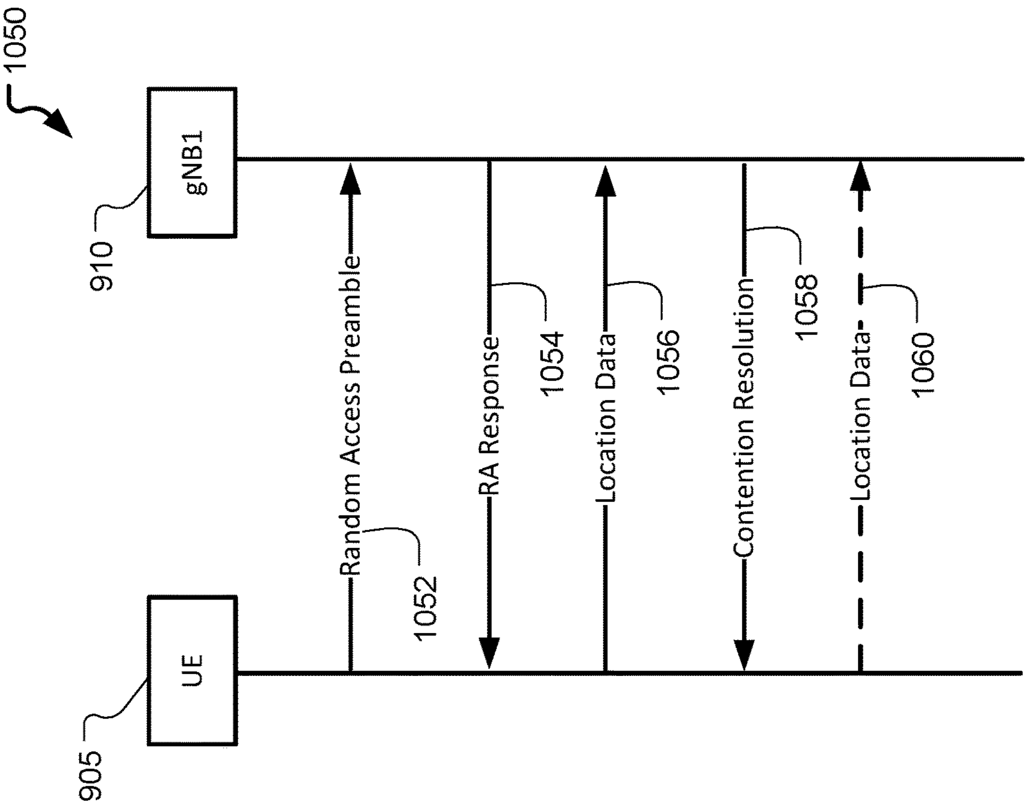

Referring to FIGS. 10A and 10B, example message flows for providing location data via a random access procedure are shown. In a two-step random access procedure 1000, the UE 905 is configured to transmit a preamble and location data message 1002. The location data may include RSTD measurements, a position estimate, or other measurement information obtained at stage 908. Upon receipt of the preamble and location data message 1002, the station 910 is configured to send a random access response message 1004. In a multi-step random access procedure 1050, the UE 905 is configured to transmit a random access preamble message 1052 (e.g., msg1) and receive a random access response message 1054 (e.g., msg2). The UE 905 is configured to provide location data message 1056 (e.g., msg3) containing the measurement, position estimates or other data obtained at stage 908. The station may provide a contention resolution message 1058 (e.g., msg4) upon receipt of the location data message 1056. In an example, the UE 905 may be configured to send an additional location data message 1060 (e.g., msg5). The UE 905 may utilize RRC or other network interfaces to perform the random access and reporting procedure 913. In an example, a station may be a UE or a Roadside Unit (RSU) and the message flows may utilize a sidelink interface (e.g., PC5) to complete the random access and reporting procedure 913.

The station 910 may be configured to provide a NGAP positioning paging results message 914 to report the location information to the server 912. The messaging may be based on LPP, NPP, NAS or other network protocols and messaging technologies. The server 912 may be configured to provide the location information to other network entities, or external clients 130.

In an example, the positioning paging message 906 may include information elements configured to cause the UE 905 to perform the measurements at stage 908 and the random access and reporting procedure 913 on a periodic basis (e.g., 5, 10, 30, 60, 100, 1000 seconds, etc.). The positioning paging message 906 may indicate a period and a duration for the UE 905 to provide the location information reports. In an example, the UE 905 may be configured to perform an UL based TDoA method based on receipt of the positioning paging message 906. The network may inform the UE 905 via SIBS, or other RRC signaling, to transmit on a random access channel with a modified timing relative to the reception of a DL PRS. The transmit power of the UE 905 may be set to a high value to enable the UE to reach multiple stations. A positioning paging message 906 may be configured to trigger the UE 905 to transmit a modified UL SRS for positioning (e.g., modified to reduce bandwidth) and provide an indication of which random access channel the UE 905 will use to transmit the modified UL SRS.

Figure 11:
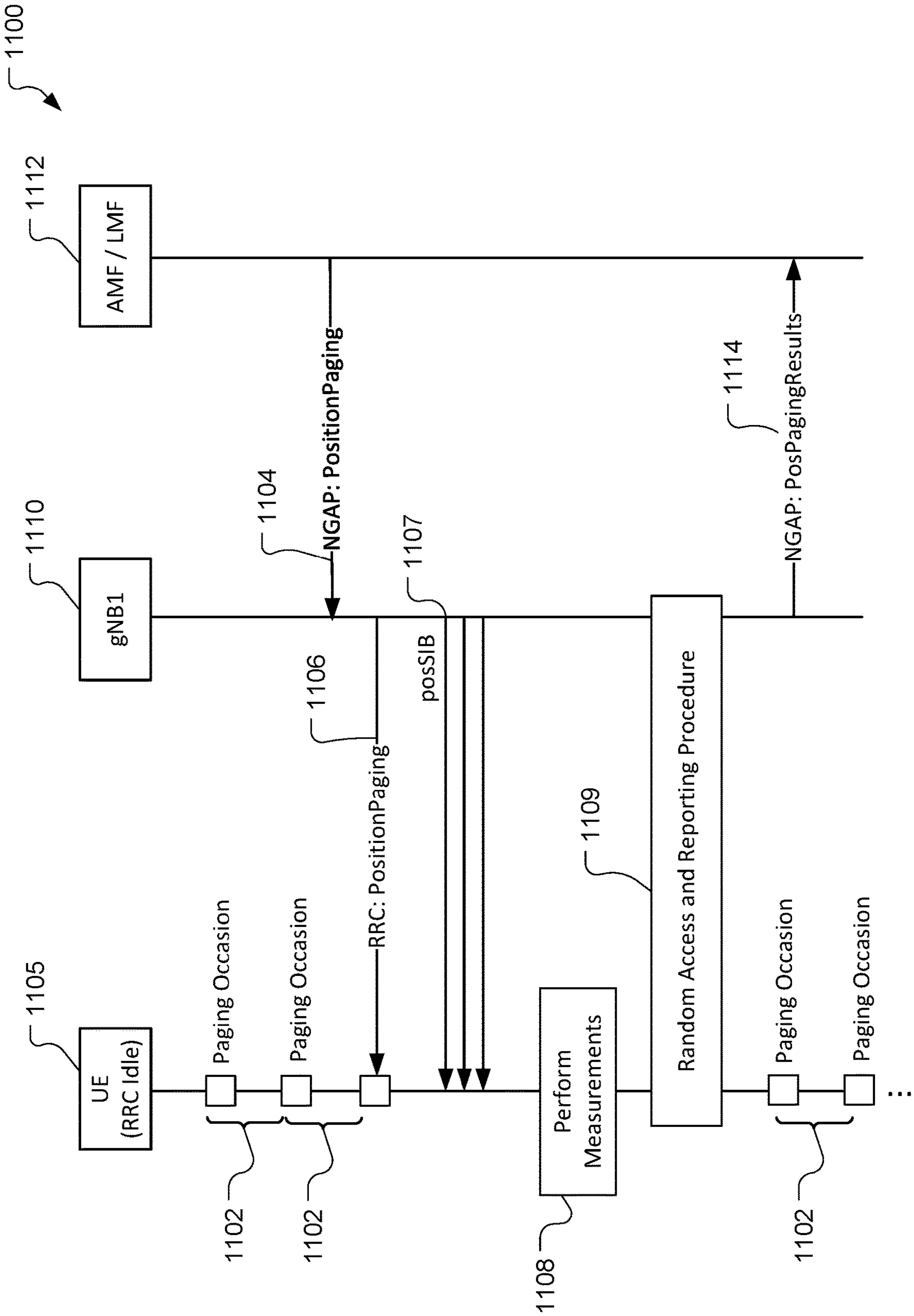
FIG. 11 is an example message flow to enable user equipment positioning through paging and positioning system information blocks.

Referring to FIG. 11, an example message flow 1100 to enable user equipment positioning through paging and positioning system information blocks is shown. The message flow 1100 includes a UE 1105, a station 1110, and a server 1112. The UE 1105 is an example of the UEs 105, 200, and the station 1110 is an example of a gNB 110*a-b* or ng-eNB 114. The server 1112 is an example of the server 400 and may be an LMF 120 and/or the AMF 115. As described in FIG. 9, the server 1112 may be communicatively coupled to an external client 130. The UE 1105 may utilize a DRX cycle 1102 and be configured to receive paging messages from the station 1110. The server 1112 may be configured to send a NGAP positioning paging message 1104 to obtain location information for the UE 1105 based on internal or external requests. The NGAP positioning paging message 1104 may include information elements associated with identification information associated with the UE 1105, DRX information, positioning assistance data, UE capability data, and other information the station 1110 may need to transmit a positioning paging message 1106 and a positioning System Information Block (posSIB) 1107 to the UE 1105. The positioning paging message 1106 may utilize RRC signaling and may be timed to coincide with the paging occasions of the UE 1105. The positioning paging message 1106 may be broadcast by one or more stations/beams associated with the tracking area associated with the UE 1105. In an example, the positioning paging message 1106 may include information elements indicating reference information to enable the UE 1105 to receive the posSIB 1107 from the station 1110, or other proximate stations. The posSIB 1107 may be based on information provided in the NGAP positioning paging message 1104, or on other system information. The posSIB 1107 may include assistance data to enable the UE 1105 to perform one or more positioning procedures. For example, the posSIB 1107 may include turnaround times and station locations associated with DL PRSs the UE 1105 may receive (e.g., based on the tracking area). Other assistance and base station almanac data such as PRS configuration information elements, station location information, and real time difference (RTD) information may be included in the posSIB 1107. In an example, the positioning paging message 1106 and the posSIB 1107 may utilize different frequency layers and different radio access technologies.

At stage 1108, the UE 1105 is configured to perform positioning measurements. In an example, the UE 1105 may remain in an idle or inactive state (i.e., not connected) to obtain passive measurements, such as described in FIG. 8. The UE 1105 may utilize assistance data provided in the positioning paging message 1106 and/or the posSIB 1107 to receive DL PRS or other positioning signals transmitted in the network. In an example, the DL PRSs may be on different frequency layers, and may be based on different radio access technologies. The assistance data may enable the UE 1105 to utilize other passive positioning methods such as E-CID, RSSI, AoA, etc. at stage 908 to obtain location information. In an example, the NGAP positioning paging message 1104 may indicate the positioning capabilities of the UE 1105 and the posSIB 1107 may be configured to include assistance data that the UE 1105 is capable of using. In an example, the posSIB 1107 may include a variety of assistance data and the UE 1105 may be configured to utilize the assistance data based on the capabilities of the UE 1105.

The UE 1105 may perform a random access and reporting procedure 1109 to report the location information obtained at stage 1108. The random access and reporting procedure 1109 may be similar to the random access and reporting procedure 913 described in FIG. 9 and the message flows described in FIGS. 10A and 10B. The station 1110 may be configured to provide a NGAP positioning paging results message 1114 to report the location information to the server 1112. The messaging may be based on LPP, NPP, NAS or other network protocols and messaging technologies. The server 1112 may be configured to provide the location information to other network entities, or external clients 130.

Figure 12:
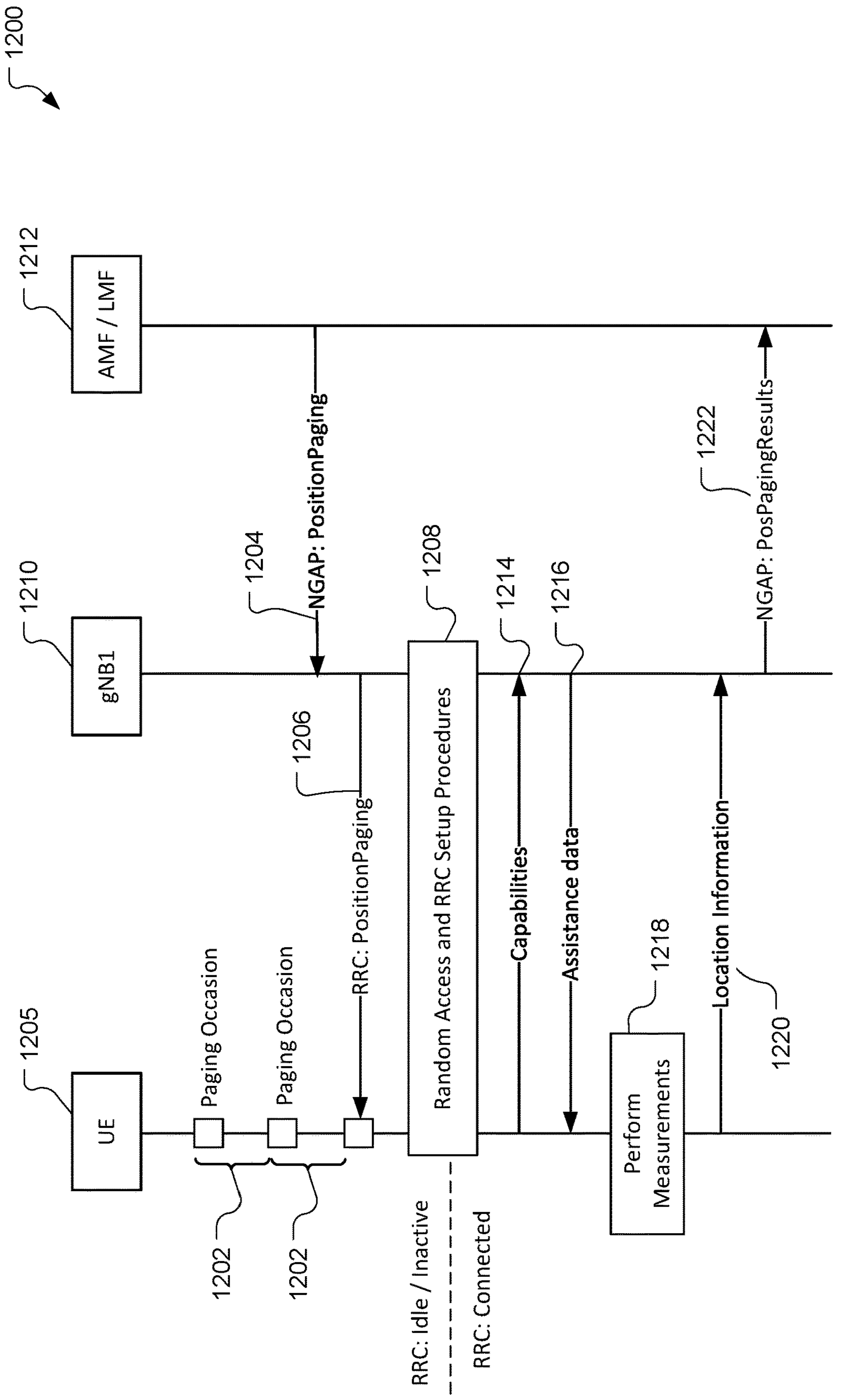
FIG. 12 is an example message flow to enable user equipment positioning through paging and connected mode messaging.

Referring to FIG. 12, an example message flow 1200 to enable user equipment positioning through paging and connected mode messaging is shown. The message flow 1200 includes a UE 1205, a station 1210, and a server 1212. The UE 1205 is an example of the UEs 105, 200, and the station 1210 is an example of a gNB 110*a-b* or ng-eNB 114. The server 1212 is an example of the server 400 and may be an LMF 120 and/or the AMF 115. As described in FIG. 9, the server 1212 may be communicatively coupled to an external client 130. The UE 1205 may utilize a DRX cycle 1202 and be configured to receive paging messages from the station 1210. In an embodiment, the UE 1205 may be in an idle state (e.g., RRC idle or RRC inactive) and configured to receive the paging messages. The server 1212 may be configured to send a NGAP positioning paging message 1204 to obtain location information for the UE 1205 based on internal or external requests. The NGAP positioning paging message 1204 may include information elements associated with identification information associated with the UE 1205, DRX information, positioning assistance data, UE capability data, and other information the station 1210 may need to transmit a positioning paging message 1206 and other assistance data to the UE 1205. In an example, an NGAP positioning paging message 1204 may be a general request for a location of a UE. The station 1210, the LMF 120, or other network resources, may be configured to provide the assistance data. The positioning paging message 1206 may utilize RRC signaling and may be timed to coincide with the paging occasions of the UE 1205. The positioning paging message 1206 may be broadcast by one or more stations/beams serving the tracking area associated with the UE 1205. In an example, the positioning paging message 1206 may prompt the UE 1205 to perform random access and RRC setup procedures 1208 to transition to an RRC connected state. The UE 1205 may be configured with a time limit (e.g., 10-500 ms) in which to start the RRC setup procedures. The UE 1205 may be configured to send a RRC setup request message on a common control channel (CCCH) to enable a connected state.

While in a connected state, the UE 1205 may be configured to perform a wide range of DL and UL positioning procedures. For example, the UE 1205 may be configured to transmit UL SRS for positioning to one or more stations. The UE 1205 may provide a capabilities message 1214 to the station 1210 to indicate the type of assistance data the UE 1205 is configured to utilize. The station 1210, or other network resource such as the LMF 120, may utilize the capabilities message 1214 to provide appropriate assistance data 1216. In an example, the capabilities of the UE 1205 may be known to the network (e.g., the LMF 120) and the station 1210 may provide assistance data 1216 based on the previously stored capabilities information. In an example, the station 1210 may provide a generic set of assistance data (i.e., not based on UE capability information) to the UE 1205.

At stage 1218, the UE 1205 is configured to perform a variety of active and passive positioning measurements. The UE may measure RTT such as described in FIG. 7, with multiple stations. Other UL methods such as UL AoA and UL SRS may be performed. Passive methods as previously described may also be performed while the UE 1205 is in a connected state. The UE 1205 may be configured to obtain position measurements with different radio access technologies and different frequency layers. For example, in a dynamic spectrum sharing scheme, the UE 1205 may perform a RTT exchanges with omnidirectional stations utilizing LTE or sub 6 GHz technologies on one frequency layer, and then perform beam formed RTT exchanges with 5G mmW stations. Other variations of frequencies and radio access technologies may be used.

The UE 1205 may report the location information measured at stage 1218 in a location information message 1220. The location information may be a position estimate based on location computations performed by the UE 1205. In an example, the UE 1205 may enter an idle or inactive state and the location information message 1220 may utilize a random access procedure as previously described. The station 1210 may be configured to provide a NGAP positioning paging results message 1222 to report the location information to the server 1212. The messaging may be based on LPP, NPP, NAS or other network protocols and messaging technologies. The server 1212 may be configured to provide the location information to other network entities, or external clients 130.

Figure 13:
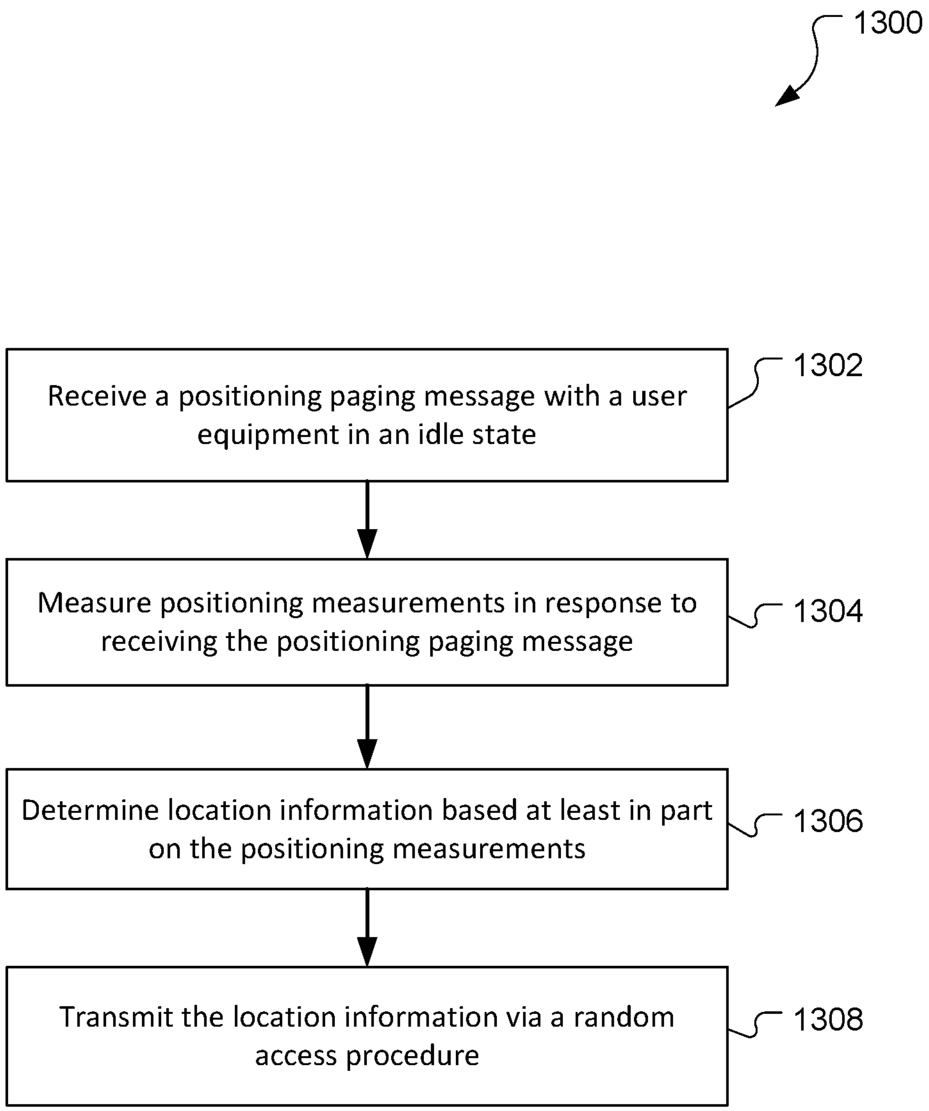
FIG. 13 is a process flow of an example method for positioning a user equipment with paging messages.

Referring to FIG. 13, with further reference to FIGS. 1-12, a method 1300 for positioning a user equipment with paging messages includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving a positioning paging message with a user equipment in an idle state. The UE 200, including the transceiver 215 and the processor 230, is a means for receiving a positioning paging message.

The idle state may include RRC idle mode and RRC inactive mode. A UE 200, such as the UE 905, may utilize a DRX mode to preserve battery life. A DRX cycle 902 may conform with a network DRX cycle and may be provided in broadcast SIB messages. The UE 905 may enter a sleep mode between periodic paging occasions, and may scan for downlink channels during the paging occasions. A positioning paging message 906 may utilize RRC signaling and may be transmitted by a station during a paging occasion. For example, the positioning paging message 906 may be an omni-directional broadcast or a beamformed beam transmitted by one or more stations covering the tracking area associated with the UE 905 stored on the AMF 115. The positioning paging message 906 may include one or more information elements containing positioning assistance data to enable the UE 905 to obtain positioning measurements. In an example, information elements in the positioning paging message 906 may include reference information to enable the UE 905 to obtain positioning assistance data from the network (e.g., via other broadcasts or messaging). In an example, the positioning paging message 1106 may indicate timing information associated with the broadcast of one or more posSIBs 1107 configured to provide positioning assistance data to a UE.

At stage 1304, the method includes measuring positioning measurements in response to receiving the positioning paging message. The UE 200, including the transceiver 215 and the processor 230, is a means for measuring the positioning measurements. In an example, the UE 905 may remain in an idle or inactive state and be configured to receive DL PRS transmissions from one or more stations such as depicted in FIG. 8. Other passive positioning methods may also be used. For example, a UE may be configured to detect beam identification information from one or more stations to determine a position estimate (e.g., E-CID positioning) Receive beam forming may be used to determine relative angles of arrival (AoA) for DL PRS transmissions. Received Signal Strengths of DL PRS transmissions may also be obtained while the UE is in an idle state (e.g., RRC idle mode or RRC inactive mode). Measurements associated with other passive positioning techniques may also be obtained. The UE may utilize assistance data to detect the DL PRS.

In an embodiment, the UE 200 may perform a RRC setup procedure in response to receiving the positioning paging message at stage 1302. While in a connected state, the UE may utilize UL channels and perform positioning methods such as UL SRS for positioning and RTT methods. The positioning measurements may be obtained on one or more frequency layers, and may utilize different radio access technologies. For example, PRS may be received utilizing LTE and 5G based technologies. Other frequencies and technologies may also be used.

At stage 1306, the method includes determining location information based at least in part on the positioning measurements. The UE 200, including the processor 230, is a means for determining location information. The location information may be the measurements values obtained at stage 1304. For example, referring to FIG. 8, the location information may be the RSTD values (e.g., T6-T3) obtained from a pair of DL PRS transmissions. The location information may include other measurement values such as E-CID values, RSS/RSSI values, and computed AoAs. The UE 200 may be configured to utilize the positioning measurements from stage 1304 to determine a location estimate. For example, the UE 200 may utilize trilateration based on RSTD information and assistance data (e.g., station/antenna location information) to compute a position estimate. Other positioning techniques as known in the art may also be used based on the positioning measurements. The location information may be the computed position estimate.

At stage 1308, the method includes transmitting the location information via a random access procedure. The UE 200, including the transceiver 215 and the processor 230, is a means for transmitting the location information. For example, referring to FIG. 9, the UE 905 is configured to perform a random access and reporting procedure 913 to report the location information. The random access and reporting procedure may utilize the RACH to perform a contention based or contention free random access procedure. In an example, a serving station may provide a UE with a dedicated random access preamble to enable the UE to provide data via the RACH. The random access procedure may be the two-step random access procedure 1000 or the multi-step random access procedure 1050. In an embodiment, the method 1300 enables the UE to perform and report positioning information without transitioning to a connected state.

In an embodiment, the positioning paging message received at stage 1302 may cause a UE to perform a connected mode setup procedure and transition from an idle or inactive state to a connected state. While in the connected state, the UE may be configured to perform UL positioning procedures, such as transmitting UL SRS for positioning and RTT. As indicated in the message flow 1200, the UE may also exchange messages associated with UE capabilities and assistance data. The location information may also be reported via uplink channels.

Figure 14:
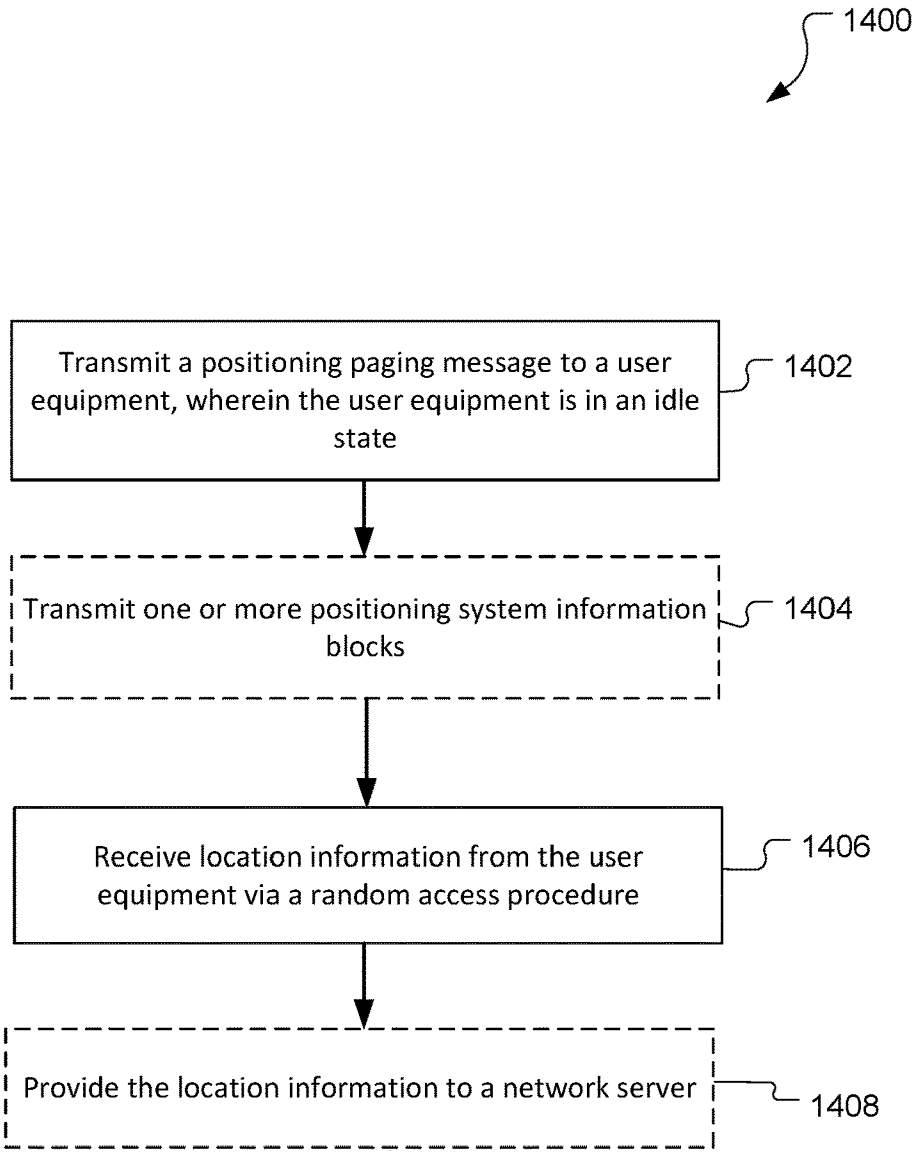
FIG. 14 is a process flow of an example method for determining a location of a user equipment.

Referring to FIG. 14, with further reference to FIGS. 1-12, a method 1400 for determining a location of a user equipment includes the stages shown. The method 1400 is, however, an example and not limiting. The method 1400 may be altered, e.g., by having stages added, removed, rearranged, combined, performed concurrently, and/or having single stages split into multiple stages. In an example, one or more of the stages 1404 and 1408 are optional and are identified with dashed lines in FIG. 14.

At stage 1402, the method includes transmitting a positioning paging message to a user equipment, wherein the user equipment is in an idle state. A TRP 300, including the transceiver 315 and the processor 310, is a means for transmitting the positioning paging message. The idle state may include RRC idle mode and RRC inactive mode. In an example, the TRP 300 may receive a NGAP positioning paging message 904 including information elements associated with identification information associated with the UE 905, DRX information, positioning assistance data, UE capability data, and other information the TRP 300 may need to transmit a positioning paging message. The NGAP positioning paging message may include fewer or additional information elements to enable the TRP 300 to transmit a positioning paging message. In an example, the positioning paging message may be the positioning paging message 906 and may utilize RRC signaling coincident with the paging occasions of an idle or inactive UE. In an example, the positioning paging message may be broadcast by other stations proximate to a tracking area associated with the UE. The positioning paging message may include information elements with positioning assistance data to enable the UE to obtain positioning measurements. The positioning paging message transmitted by the TRP 300 may include one or more information elements (e.g., assistance data) based on the positioning capabilities of the UE. The positioning paging message may include reference information to enable the UE to obtain positioning assistance data from the network (e.g., via other broadcasts or messaging).

At stage 1404, the method may optionally include transmitting one or more positioning system information blocks. The TRP 300, including the transceiver 315 and the processor 310, is a means for transmitting the positioning information blocks. The positioning paging message transmitted at stage 1402 may include reference information to enable the UE to receive the positioning system information blocks while in a non-connected state. The positioning system information blocks may be based on information provided in the NGAP positioning paging message, or on other positioning assistance data on the network. In general, the positioning system information block may include assistance data to enable the UE to perform one or more positioning procedures. For example, the positioning system information block may include RSTD information such as turnaround times and station locations associated with DL PRSs the UE may receive. Other assistance and base station almanac data (e.g., station and beam ID information, beam angles, channel information, PRS resources, etc.) may be included in the positioning system information block.

At stage 1406, the method includes receiving location information from the user equipment via a random access procedure. The TRP 300, including the transceiver 315 and the processor 310, is a means for receiving the location information. The UE is configured to obtain position measurements and generate location information. In an example, the location information may be measurement data (e.g., RSTD measurements, E-CID data, AoA, etc.). The location information may be a position estimate determined by the UE based on the measurements. In an embodiment, the TRP 300 may be configured to determine a position estimate based on the received location information. The UE is configured to perform a random access and reporting procedure with the TRP 300 to report the location information. The random access and reporting procedure may utilize the RACH to perform a contention based or contention free random access procedure. The TRP 300, or a serving station, may provide a UE a dedicated random access preamble to enable the UE to provide data to the TRP 300 via the RACH. In an example, the random access procedure may be the two-step random access procedure 1000 or the multi-step random access procedure 1050.

At stage 1408, the method may optionally include providing the location information to a network server. The TRP 300, including the transceiver 315 and the processor 310, is a means for providing the location information to a server. The location information may be measurement data and the TRP may send the measurement data in a NGAP positioning paging results message to a network server such as the LMF 120. The LMF 120 may be configured to determine an estimated position of the UE based on the measurement data. The location information may be a position estimate determined by the UE or the TRP 300, and the NGAP positioning paging results message may include the position estimate. The LMF 120 may be configured to provide the position estimate to other network resources, and/or external clients 130 as required.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for positioning a user equipment with paging messages, comprising:
 - receiving a positioning paging message with the user equipment in an idle state;
 - measuring positioning measurements in response to receiving the positioning paging message;
 - determining location information based at least in part on the positioning measurements; and
 - transmitting the location information via a random access procedure.

2. The method of clause 1 further comprising receiving assistance data, wherein measuring the positioning measurements is based at least in part on the assistance data.

3. The method of clause 2 wherein at least a portion of the assistance data is included in the positioning paging message.

4. The method of clause 2 further comprising receiving a positioning system information block, wherein at least a portion of the assistance data is included in the positioning system information block.

5. The method of clause 1 wherein measuring the positioning measurements includes receiving two or more positioning reference signals and determining the location information includes determining a time of arrival, time difference of arrival based on the two or more positioning reference signal.

6. The method of clause 1 wherein measuring the positioning measurements includes receiving enhanced cell identification (E-CID) information from one or more proximate stations.

7. The method of clause 1 wherein measuring the positioning measurements includes determining an angle of arrival of one or more beams transmitted by one or more proximate stations.

8. The method of clause 1 wherein the random access procedure is a two-step random access procedure.

9. The method of clause 1 wherein the user equipment is configured to execute a discontinuous reception mode and the positioning paging message is received during a paging occasion.

10. The method of clause 1 further comprising receiving a random access preamble, wherein transmitting location information includes transmitting the random access preamble.

11. The method of clause 1 wherein at least one information element within the positioning paging message is based at least in part on a positioning capability of the user equipment.

12. The method of clause 1 wherein the positioning paging message includes one or more information elements configured to cause the user equipment to measure positioning measurements and transmit corresponding location information on a periodic basis.

13. The method of clause 1 further comprising performing a connected mode setup procedure in response to receiving the positioning paging message, wherein measuring the positioning measurements includes obtaining positioning measurements in a connected mode.

14. The method of clause 13 wherein obtaining the positioning measurements includes obtaining round trip time measurements with one or more stations.

15. The method of clause 1 wherein measuring the positioning measurements includes transmitting a modified sounding reference signal for positioning based at least in part on the positioning paging message.

16. A method for determining a location of a user equipment, comprising:

transmitting a positioning paging message to the user equipment, wherein the user equipment is an idle state; and receiving location information from the user equipment via a random access procedure.

17. The method of clause 16 further comprising transmitting one or more positioning system information blocks comprising positioning assistance data.

18. The method of clause 16 further comprising providing the location information to a network server.

19. The method of clause 16 wherein transmitting the positioning paging message includes transmitting the positioning paging message on a plurality of beams.

20. The method of clause 16 further comprising receiving positioning assistance data from a server, wherein at least one information element in the positioning paging message is based on the positioning assistance data.

21. The method of clause 20 wherein the positioning assistance data includes one or more positioning reference signal resource elements.

22. The method of clause 16 wherein the positioning paging message includes a random access preamble and receiving the location information includes receiving the random access preamble.

23. The method of clause 16 wherein the random access procedure is a two-step random access procedure.

24. The method of clause 16 wherein the user equipment is in a discontinuous reception mode, and transmitting the positioning paging message is based at least in part on a paging occasion associated with the discontinuous reception mode.

25. The method of clause 16 wherein at least one information element in the positioning paging message is based on a positioning capability of the user equipment.

26. The method of clause 16 wherein at least one information element in the positioning paging message is configured to cause the user equipment to provide periodic location information.

27. The method of clause 16 further comprising transmitting a positioning reference signal subsequent to transmitting the positioning paging message.

28. The method of clause 16 further comprising performing a connected state setup procedure with the user equipment subsequent to transmitting the positioning paging message.

29. An apparatus, comprising:

a memory;

at least one transceiver;

at least one processor communicatively coupled to the memory and the at least one transceiver and configured to:

receive a positioning paging message while in an idle state;

measure positioning measurements in response to receiving the positioning paging message;

determine location information based at least in part on the positioning measurements; and transmit the location information via a random access procedure.

30. The apparatus of clause 29 wherein the at least one processor is further configured to: receive assistance data; and perform the positioning measurements is based at least in part on the assistance data.

31. The apparatus of clause 30 wherein at least a portion of the assistance data is included in the positioning paging message.

32. The apparatus of clause 30 wherein the at least one processor is further configured to receive a positioning system information block, wherein at least a portion of the assistance data is included in the positioning system information block.

33. The apparatus of clause 29 wherein the at least one processor is further configured to:

receive two or more positioning reference signals; and determine a time of arrival, time difference of arrival based on the two or more positioning reference signal.

34. The apparatus of clause 29 wherein the at least one processor is further configured to receive enhanced cell identification (E-CID) information from one or more proximate stations.

35. The apparatus of clause 29 wherein at the at least one processor is further configured to determine an angle of arrival of one or more beams transmitted by one or more proximate stations.

36. The apparatus of clause 29 wherein the random access procedure is a two-step random access procedure.

37. The apparatus of clause 29 wherein the at least one processor is further configured to:

execute a discontinuous reception mode; and receive the positioning paging message during a paging occasion.

38. The apparatus of clause 29 wherein the at least one processor is further configured to receive a random access preamble, and transmit location information with the random access preamble.

39. The apparatus of clause 29 wherein at least one information element within the positioning paging message is based at least in part on a positioning capability of the apparatus.

40. The apparatus of clause 29 wherein the positioning paging message includes one or more information elements configured to cause the apparatus to measure positioning measurements and transmit corresponding location information on a periodic basis.

41. The apparatus of clause 29 wherein the at least one processor is further configured to:

perform a connected mode setup procedure in response to receiving the positioning paging message; and obtain positioning measurements in a connected mode.

42. The apparatus of clause 41 wherein the at least one processor is further configured to obtain round trip time measurements with one or more stations.

43. The apparatus of clause 42 wherein the at least one processor is further configured to transmit a modified sounding reference signal for positioning based at least in part on the positioning paging message.

44. An apparatus, comprising:

a memory;

at least one transceiver;

at least one processor communicatively coupled to the memory and the at least one transceiver and configured to:

transmit a positioning paging message to a user equipment, wherein the user equipment is an idle state; and receive location information from the user equipment via a random access procedure.

45. The apparatus of clause 44 wherein the at least one processor is further configured to transmit one or more positioning system information blocks comprising positioning assistance data.

46. The apparatus of clause 44 wherein the at least one processor is further configured to provide the location information to a network server.

47. The apparatus of clause 44 wherein the at least one processor is further configured to transmit the positioning paging message on a plurality of beams.

48. The apparatus of clause 44 wherein the at least one processor is further configured to receive positioning assistance data from a server, wherein at least one information element in the positioning paging message is based on the positioning assistance data.

49. The apparatus of clause 44 wherein the positioning paging message includes a random access preamble and the at least one processor is configured to receive the random access preamble.

50. The apparatus of clause 44 wherein the random access procedure is a two-step random access procedure.

51. The apparatus of clause 44 wherein the user equipment is in a discontinuous reception mode, and the at least one processor is configured to transmit the positioning paging message based at least in part on a paging occasion associated with the discontinuous reception mode.

52. The apparatus of clause 44 wherein at least one information element in the positioning paging message is based on a positioning capability of the user equipment.

53. The apparatus of clause 44 wherein at least one information element in the positioning paging message is configured to cause the user equipment to provide periodic location information.

54. The apparatus of clause 44 wherein the at least one processor is further configured to transmit a positioning reference signal subsequent to transmitting the positioning paging message.

55. The apparatus of clause 44 wherein the at least one processor is further configured to perform a connected state setup procedure with the user equipment subsequent to transmitting the positioning paging message.

56. An apparatus, comprising:

means for receiving a positioning paging message while in an idle state;

means for measuring positioning measurements in response to receiving the positioning paging message;

means for determining location information based at least in part on the positioning measurements; and means for transmitting the location information via a random access procedure.

57. An apparatus, comprising:

means for transmitting a positioning paging message to a user equipment, wherein the user equipment is an idle state; and means for receiving location information from the user equipment via a random access procedure.

58. A non-transitory processor-readable storage medium comprising processor-readable instructions configured to cause one or more processors to position a user equipment with paging messages, comprising:

code for receiving a positioning paging message with the user equipment in an idle state;

code for measuring positioning measurements in response to receiving the positioning paging message;

code for determining location information based at least in part on the positioning measurements; and code for transmitting the location information via a random access procedure.

59. A non-transitory processor-readable storage medium comprising processor-readable instructions configured to cause one or more processors to determine a location of a user equipment, comprising:

code for transmitting a positioning paging message to the user equipment, wherein the user equipment is an idle state; and code for receiving location information from the user equipment via a random access procedure.

The invention claimed is:

1. A method for positioning a user equipment with paging messages, comprising:

receiving a positioning paging message with the user equipment in an idle state, the positioning paging message including at least one assistance data indication, wherein the positioning paging message indicates a period and a duration for the user equipment to provide location information;

receiving assistance data based on the at least one assistance data indication;

measuring positioning measurements by the user equipment with the user equipment in the idle state in response to receiving, and based on, the at least one assistance data indication of the positioning paging message;

determining the location information based at least in part on the positioning measurements; and transmitting the location information via a random access procedure.

2. The method of claim 1 wherein measuring the positioning measurements is based at least in part on the assistance data.

3. The method of claim 2 wherein at least a portion of the assistance data is included in the positioning paging message.

4. The method of claim 2 further comprising receiving a positioning system information block, wherein at least a portion of the assistance data is included in the positioning system information block.

5. The method of claim 1 wherein measuring the positioning measurements includes receiving enhanced cell identification (E-CID) information from one or more proximate stations.

6. The method of claim 1 wherein the random access procedure is a two-step random access procedure.

7. The method of claim 1 wherein the user equipment is configured to execute a discontinuous reception mode and the positioning paging message is received during a paging occasion.

8. The method of claim 1 further comprising receiving a random access preamble, wherein transmitting location information includes transmitting the random access preamble.

9. The method of claim 1 wherein at least one information element within the positioning paging message is based at least in part on a positioning capability of the user equipment.

10. The method of claim 1 further comprising, in response to one or more elements in the positioning paging message, measuring positioning measurements and transmit corresponding location information on a periodic basis.

11. The method of claim 1 further comprising performing a connected mode setup procedure in response to receiving the positioning paging message, wherein measuring the positioning measurements includes obtaining positioning measurements in a connected mode.

12. The method of claim 11 wherein obtaining the positioning measurements includes obtaining round trip time measurements with one or more stations.

13. The method of claim 1 wherein measuring the positioning measurements includes transmitting a modified sounding reference signal for positioning based at least in part on the positioning paging message.

14. The method of claim 1 wherein the at least one assistance data indication includes reference information to enable the user equipment to obtain the assistance data.

15. A method for determining a location of a user equipment, comprising:

transmitting a positioning paging message to the user equipment, wherein the user equipment is an idle state, the positioning paging message including at least one assistance data indication to assist the user equipment to perform positioning measurements while the user equipment is in the idle state, wherein the positioning paging message indicates a period and a duration for the user equipment to provide location information; and receiving the location information from the user equipment via a random access procedure.

16. The method of claim 15 further comprising transmitting one or more positioning system information blocks comprising positioning assistance data.

17. The method of claim 15 wherein transmitting the positioning paging message includes transmitting the positioning paging message on a plurality of beams.

18. The method of claim 15 wherein the positioning paging message includes a random access preamble and receiving the location information includes receiving the random access preamble.

19. The method of claim 15 wherein the random access procedure is a two-step random access procedure.

20. The method of claim 15 wherein the user equipment is in a discontinuous reception mode, and transmitting the positioning paging message is based at least in part on a paging occasion associated with the discontinuous reception mode.

21. The method of claim 15 wherein at least one information element in the positioning paging message is based on a positioning capability of the user equipment.

22. The method of claim 15 wherein at least one information element in the positioning paging message is configured to cause the user equipment to provide periodic location information.

23. The method of claim 15 further comprising transmitting a positioning reference signal subsequent to transmitting the positioning paging message.

24. The method of claim 15 further comprising performing a connected state setup procedure with the user equipment subsequent to transmitting the positioning paging message.

25. An apparatus, comprising:

a memory;

at least one transceiver;

at least one processor communicatively coupled to the memory and the at least one transceiver and configured to:

receive a positioning paging message while in an idle state, the positioning paging message including at least one assistance data indication, wherein the positioning paging message indicates a period and a duration for a user equipment to provide location information;

receive assistance data based on the at least one assistance data indication;

measure positioning measurements with the user equipment in the idle state in response to receiving, and based on, the at least one assistance data indication of the positioning paging message;

determine the location information based at least in part on the positioning measurements; and transmit the location information via a random access procedure.

26. The apparatus of claim 25 wherein the at least one processor is further configured to: receive assistance data; and measure the positioning measurements is based at least in part on the assistance data.

27. The apparatus of claim 26 wherein at least a portion of the assistance data is included in the positioning paging message.

28. The apparatus of claim 25 wherein the at least one processor is further configured to:

execute a discontinuous reception mode; and receive the positioning paging message during a paging occasion.

29. The apparatus of claim 25 wherein the at least one processor is further configured to receive a random access preamble, and transmit the location information with the random access preamble.

30. The apparatus of claim 25 wherein at least one information element within the positioning paging message is based at least in part on a positioning capability of the apparatus.

31. The apparatus of claim 25 wherein the at least one assistance data indication includes reference information to enable the apparatus to obtain the assistance data.

32. An apparatus, comprising:

a memory;

at least one transceiver;

at least one processor communicatively coupled to the memory and the at least one transceiver and configured to:

transmit a positioning paging message to a user equipment, wherein the user equipment is an idle state, the positioning paging message including at least one assistance data indication to assist the user equipment to perform positioning measurements while the user equipment is in the idle state, wherein the positioning paging message indicates a period and a duration for the user equipment to provide location information; and receive the location information from the user equipment via a random access procedure.

* * * * *